US006923156B2

United States Patent
Iwata et al.

(10) Patent No.: US 6,923,156 B2
(45) Date of Patent: Aug. 2, 2005

(54) AIR INTAKE SYSTEM FOR MULTI-CYLINDER ENGINE

(75) Inventors: Noriyuki Iwata, Aki-gun (JP); Shigeyuki Hirashita, Aki-gun (JP); Takashi Yohso, Aki-gun (JP); Tatsuya Fujikawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/668,604

(22) Filed: Sep. 24, 2003

(65) Prior Publication Data

US 2004/0144359 A1 Jul. 29, 2004

(30) Foreign Application Priority Data

Sep. 30, 2002 (JP) ........................................ 2002-286651

(51) Int. Cl.[7] .............................................. F02M 35/10
(52) U.S. Cl. ...................... 123/336; 123/337; 123/319; 123/184.1
(58) Field of Search ....................... 123/184.21, 184.26, 123/184.22, 184.47, 336, 337, 319

(56) References Cited

U.S. PATENT DOCUMENTS 4,892,071 A * 1/1990 Asayama .................... 123/336
6,712,040 B1 * 3/2004 Giffin ........................ 123/336

FOREIGN PATENT DOCUMENTS

| DE | 39 36 263 A | 5/1990 |
| EP | 0 822 325 A | 2/1998 |
| FR | 793 114 A | 1/1936 |
| JP | 5-078651 | 10/1993 |
| JP | 2001-073813 | 3/2001 |

* cited by examiner

*Primary Examiner*—Bibhu Mohanty
(74) *Attorney, Agent, or Firm*—Nixon Peabody LLP; Donald R. Studebaker

(57) ABSTRACT

A throttle device is arranged in the midstream of an individual passage consisting of a low-speed individual intake passage and a high-speed individual intake passage on the downstream of a surge tank. A valve body is rotatably provided in the throttle valve device. The inside of the valve body is formed with an in-valve low-speed passage and an in-valve high-speed passage that are adjacently placed with respect to the rotational axis of the valve body. The intake air supply is performed through only the low-speed individual passage when the opening of the valve body is equal to or less than a predetermined value, and through both the low-speed individual intake passage and high-speed individual intake passage when the opening of the body is larger than the predetermined value.

3 Claims, 6 Drawing Sheets

AIR INTAKE SYSTEM FOR MULTI-CYLINDER ENGINE

TECHNICAL FIELD OF THE INVENTION

The present invention relates to an intake system of a multi-cylinder engine.

BACKGROUND OF THE INVENTION

Conventionally, a so-called multi-throttle valve is known in which throttle valves are disposed in individual intake passages for each cylinder of an engine. The multi-throttle valve linearly adjusts the amount of intake air according to driver's demand for example, thereby improving acceleration response. Moreover, a rotary-type throttle valve is known in which its valve body has a rotatable and cylindrical shape and is formed with an intake passage therein, while being located closely to a combustion chamber in an intake passage. (refer to Japanese publication of patent application no. 2001-73813) This throttle valve should be located as closely as possible to the engine, on the downstream side of the intake passage, for further improvement in acceleration response, because this arrangement reduces the volume of the portion of the intake passage downstream of the throttle valve, thereby improving acceleration response. Additionally, a so-called inertia effect of the intake flow is known which improves volumetric efficiency of intake air to generate high engine output. The effect is attained by: an intake passage comprising a low-speed passage and a high-speed passage for supplying intake air from a surge tank to a combustion chamber; and a switching valve provided at a collecting portion of the passages.

The switching valve changes the length of the intake passage in accordance with the engine rotational speed so that the frequency of the intake pressure fluctuation caused by the descending motion of a piston during the intake stroke (the value associated with the engine rotational speed) is synchronized with the natural frequency of the intake system determined from the length of the intake passage and the volume of the cylinder, thereby attaining the inertia effect of the intake flow (refer to Japanese granted patent application no. 5-78651, for example.)

In the case where the engine, utilizing the inertia effect of the intake flow, is equipped with the throttle valve close to its combustion chamber, at least two valves, (i.e., the switching valve for controlling the inertia effect of the intake flow and the throttle valve) are located closely to the combustion chamber or the engine body. This causes problems such as a considerably complex structure with difficulty in the layout of the intake system.

SUMMARY OF THE INVENTION

In view of the aspect above, an object of the present invention is to provide a simple intake system for a multi-cylinder engine which improves the inertia effect of the intake flow and acceleration response at once.

According to the prevent invention, an object is achieved by an air intake system for a multi-cylinder engine comprising: a common intake passage for supplying the intake air to a combustion chamber of each cylinder, a plurality of individual intake passages branching off from the common intake passage so as to supply the intake air to the combustion chamber of each cylinder, a rotary-type throttle valve provided for each of the individual intake passages, including a valve body in a circular shape, when viewed along its rotational axis, which defines a space as a part of an intake passage, and being capable of linearly controlling the amount of intake air supplied into the combustion chambers, wherein, each of the individual intake passages are formed out of a plurality of branched intake passages which supply intake air to the throttle valve, and the throttle valve is designed so that the rotational movement of the throttle valve selectively achieves a first state where intake air is supplied through a part of the branched intake passages with the remaining passages substantially blocking the intake air supply into the combustion chamber, or a second state where intake air supplied through all of the branched intake passages.

As a result, the valve having the functions of the inertia effect and the intake flow, as well as the throttle valve can be located relatively closely to the combustion chamber in the engine, thereby attaining both the inertia effect of the intake flow and the acceleration response with a simple structure.

Additionally, in accordance with the present invention, the inside of the throttle valve is formed with a first in-valve intake passage which is adapted to communicate the part of the branched intake passages with the combustion chamber, and a second in-valve intake passage which is adapted to communicate the remaining branched intake passages with the combustion chamber. This simple structure improves the inertia effect of the intake flow and the acceleration response.

Moreover, in accordance with the present invention, the throttle valve is positioned so that its rotational axis is in parallel with the engine crankshaft, the first in-valve intake passage and the second in-valve intake passage are positioned adjacently with respect to the rotational axis, and downstream of the individual intake passage from an opening of each in-valve intake passage is arranged so as to direct along the tangential direction of a cylinder bore when view from above with respect to the vertical direction of the engine. This permits the intake air, supplied from the first in-valve intake passage and the second in-valve intake passage into the combustion chamber, to generate intensified swirl, thereby improving combustibility.

Furthermore, in accordance with the present invention, the first in-valve intake passage and the second in-valve intake passage are arranged adjacently with respect to the rotational axis direction of the throttle valve, and the transition from the first state to the second state caused by the rotation of the throttle valve is achieved in such a manner that:

from the first state where the communication is fully achieved between the first in-valve intake passage and the individual intake passage downstream of the first in-valve intake passage and the communication is fully blocked between the second in-valve intake passage and the individual intake passage downstream of the second in-valve intake passage, the communicative opening is gradually increased between the second in-valve intake passage and the individual intake passage downstream of the second in-valve intake passage, thereby attaining the second state.

This enables the intake air to be linearly adjusted because the amount of the intake air is gradually increased during the transition from the first state to the second state as the throttle valve rotates.

Still further, according to the another aspect of the present invention, an object is achieved by an air intake system for multi-cylinder engine comprising: a common intake passage for supplying the intake air to a combustion chamber of each cylinder, a plurality of individual intake passages branching off from the common intake passage so as to supply the intake air to the combustion chamber of each cylinder, a rotary-type throttle valve provided for each of the individual intake passages, including a valve body in a circular shape when viewed along its rotational axis which defines a space as a part of an intake passage, and being capable of linearly controlling the amount of intake air supplied into the combustion chambers, wherein, the individual intake passage comprises a low-speed branched intake passage and a high-speed branched intake passage which supply the intake air to the throttle valve, the inside of the valve body of the throttle valve is formed with an in-valve low-speed passage which is adapted to communicate the low-speed branched intake passage with the combustion chamber, and an in-valve high-speed passage which is adapted to communicate the high-speed branch intake passage with the combustion chamber, the control device is provided for controlling the opening of the throttle valve in accordance with the engine operational condition so that the low-speed branch passage and the in-valve low-speed passage are in communication with each other when the engine rotational speed is low, and the high-speed branch passage and the in-valve high-speed passage are in communication with each other when the engine rotational speed is high, and the in-valve low-speed passage is designed so as to be in full communication with the low-speed branch passage during the high speed operation.

As a result, this simple structure including the low-speed branched passage and the high-speed branched passage accomplishes the improvement in the inertia effect of the intake flow and the acceleration response over a broad region ranging from low rotational speed to high rotational speed of the engine.

Additionally, in accordance with the another aspect of the present invention, the in-valve low-speed passage is defined by inner walls which are oppositely arranged in the valve body and are in parallel with the rotational axis of the throttle valve, and the central portions of the inner walls with respect to the direction of the intake flow are formed into a convex shape in such a way that the central portions are closer to the rotational axis than the upstream end and the downstream end of the inner walls with respect to the intake flow.

This decreases the resistance to intake flow through the low speed passage inside the valve body.

Moreover, in accordance with the present a volume chamber is formed in a portion where the common passage and the individual passage are connected with each other.

This ensures that a plurality of the branched intake passages improve the inertia effect of the intake flow.

These and other objects, features, aspects, and advantages of the present invention will became apparent from the following detail description of the preferred embodiment relative to the accompanied drawings.

DETAILED DESCRIPTION OF THE INVENTION

Preferred embodiments of the present invention will be described with reference to the accompanying drawings.

Figure 1:
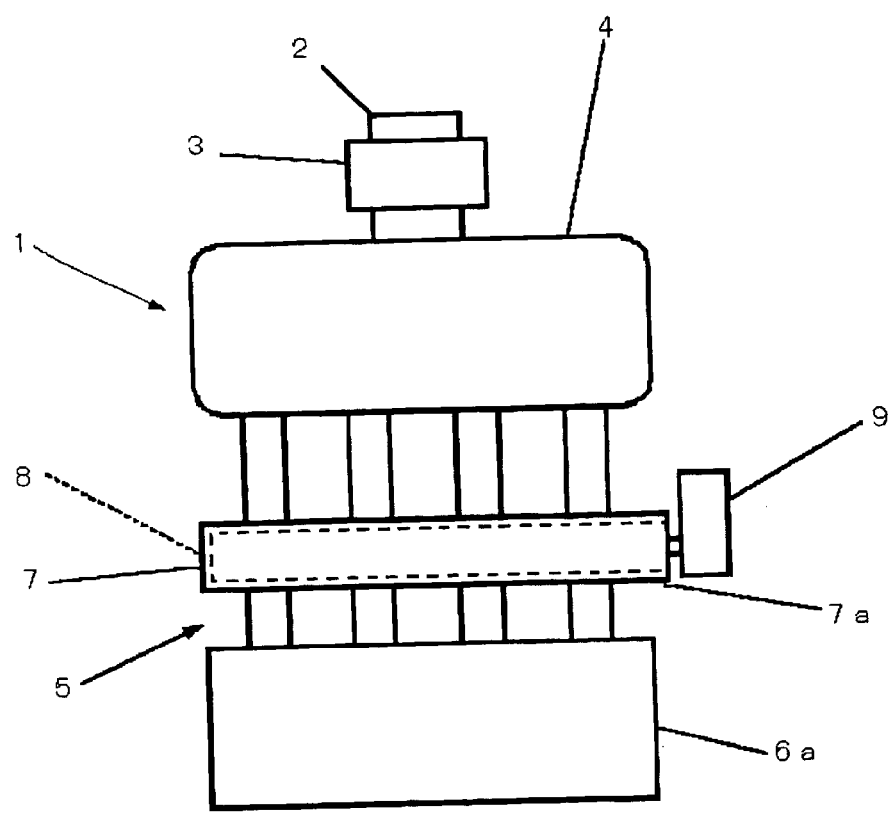
FIG. 1 is a schematic diagram illustrating an overall structure of an engine intake system 1 in accordance with the present invention.

FIG. 1 to FIG. 11 illustrate an intake system of a four-cylinder engine. FIG. 1 illustrates an overall configuration of the four-cylinder internal combustion engine. An intake system 1 is provided with a duct 2 for introducing the intake air from atmosphere, an air cleaner 3 communicating (e.g., connected) with the duct 2 in order to remove dust from the intake air, a surge tank 4 for introducing the intake air from the air cleaner 3 so that the intake air does not pass through the throttle valve, and individual intake passages 5 formed corresponding to each cylinder so as to supply the intake air from the surge tank 4 to each combustion chamber of an engine body 6a. A rotary-type throttle valve device 7 is provided for each of the individual intake passage 5 at a midway portion between the surge tank 4 and the combustion chamber 6 (shown in FIG. 2). The valve device 7 has a transversely elongated shape and is arranged in parallel with a crankshaft (not shown) of the engine, that is, generally perpendicular to each individual intake passage 5. The throttle valve device 7 extends in the axial direction of a crankshaft over all the individual intake passages 5. The inside of the throttle valve device 7 defines a cylindrical space. The space is oriented along the elongated contour of the throttle valve device 7 and spans over all the individual intake passages 5. A valve body 8, roughly similar to the space in shape, is rotatably fitted within the space, and an actuator 9 is mounted on one side end of the valve body 8 for rotating the valve body 8. In assembling the valve body 8 into the space, the valve body 8 is inserted through an opening 7a at one side with respect to the longitudinal direction of the throttle valve device 7. This decreases the number of parts of the throttle valve device 7 and achieves the assembling work of the valve body 8 for regulating the intake air for all the four cylinders in substantially one-operation, which eases the assembling work. The surge tank 4 and the upstream portions of the individual intake passages 5 extending from the surge tank 4 to the throttle valve device 7 are integrally formed, and a contour portion of the throttle valve device 7 is formed unitarily with the downstream portion of the individual intake passages 5 extending from the throttle valve device 7 to the engine 6a. This reduces the number of the parts of the overall intake device 1, resulting in improvement in ease of assembling operation.

In each intake passage 5, the portion from the surge tank 4 to the combustion chamber 6 is partitioned into a low-speed individual intake passage 10 and a high-speed individual passage 11 by a partition so that the low-speed individual passage 10 and the high-speed individual intake passage 11 are defined adjacently with respect to the axial direction of the crankshaft of the engine, as will be described below.

Figure 2:
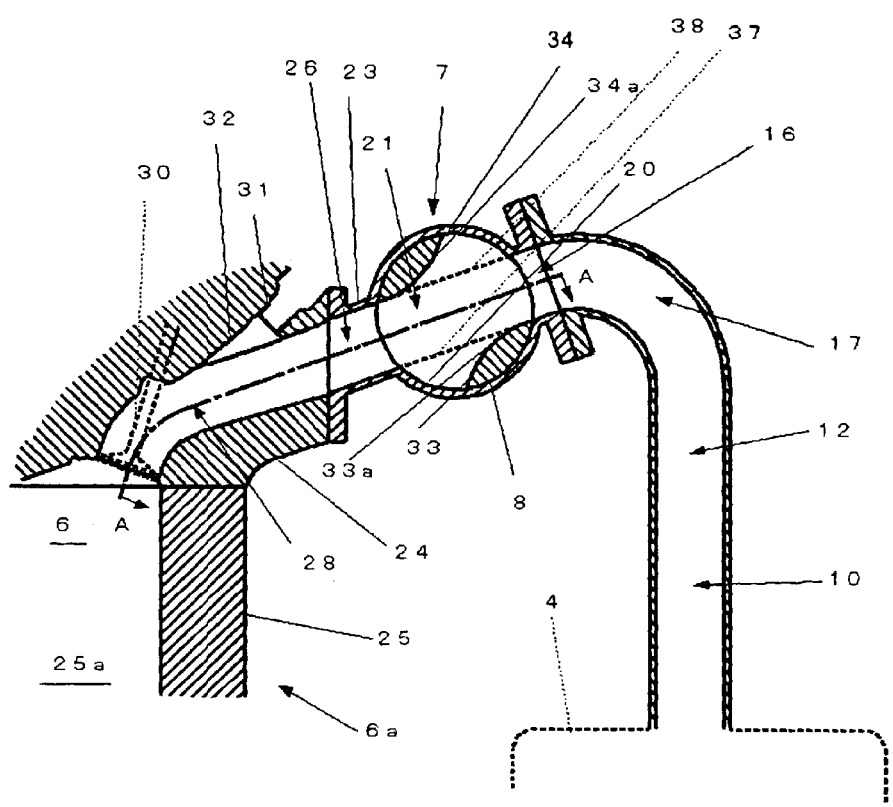
FIG. 2 is a cross-sectional view of a portion of the engine intake system 1, taken in the axial direction of the crankshaft of the engine.
Figure 3:
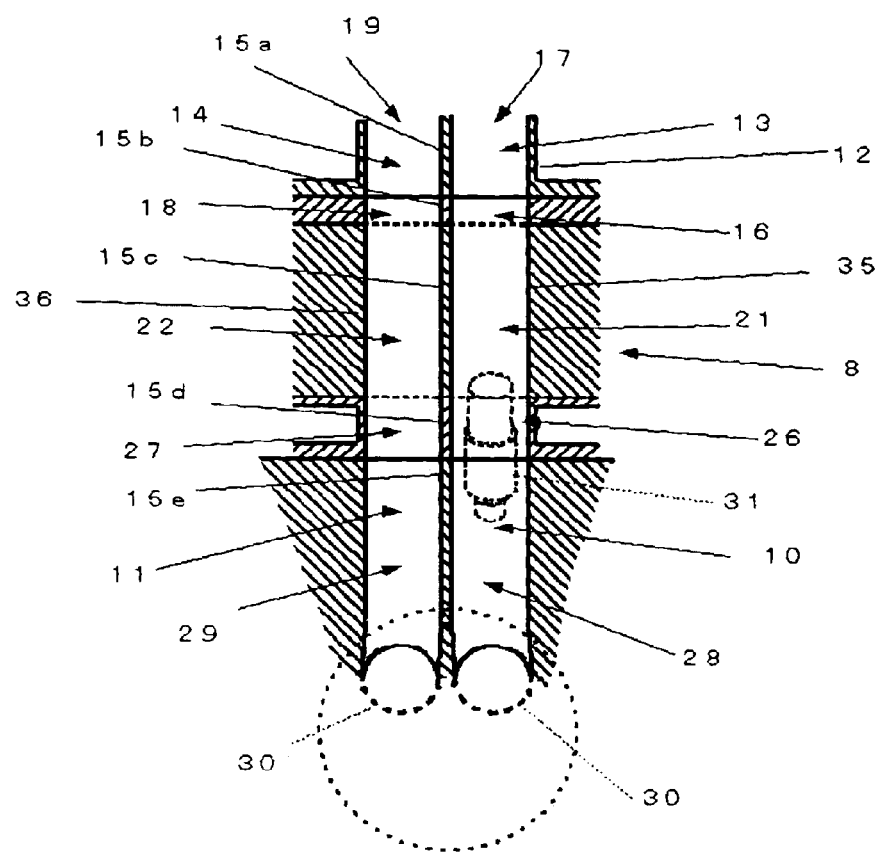
FIG. 3 is a schematic cross-sectional top plan view taken along the line A—A.

FIG. 2 shows a cross-sectional view of the low-speed individual intake passage 10 of the individual intake passage 5 for a cylinder of the intake device 1 according to the present invention, in a condition where the valve body 8 has brought the low-speed and high-speed individual intake passages 10 and 11 into a fully open state. The cross-section is viewed in the axial direction of the crankshaft of the engine. FIG. 3 schematically shows a cross-sectional view taken along a line A—A in FIG. 2. The cross-section is viewed from above with respect to the vertical direction of the engine body 6a, with the valve body 8 being fully opened. Referring to these drawings, the surge tank 4 is located lower than the throttle valve device 7 with respect to the vertical direction of the engine body 6a. A throttle-valve upstream passage 12 of the individual intake passage 5, communicating with the surge tank 4, extends from the surge tank 4 upwardly with respect to the vertical direction of the engine body 6a and curves in U-shape towards the engine body 6a. The inside of the throttle-valve upstream passage 12 is divided into an upstream-side low-speed branched passage 13 and an upstream-side high-speed branched passage 14 by a partition so that the upstream-side low-speed branched passage 13 and the upstream high-speed passage 14 are defined adjacently with respect to the axial direction of the crankshaft.

The throttle valve device 7 is attached to the throttle-valve upstream passage 12 at an end on the side of engine body 6a. In the throttle valve device 7, the portion communicating with the throttle-valve upstream passage 12 is divided into an in-throttle upstream-side low-speed branched passage 16 and in-throttle upstream-side high-speed branched passage 18 by a partition 15b so that the valve upstream-side low-speed branched passage 16 and the valve upstream high-speed passage 18 are defined adjacently with respect to the axial direction of the crankshaft. Downstream of both the valve upstream low-speed passage 16 and the valve upstream high-speed passage 18, a cylindrical space is formed extending in parallel with the axial direction of the crankshaft. In the space, the valve body 8 is fitted. The in-throttle upstream-side low-speed branched passage 16 forms an upstream-side low-speed branched individual intake passage 17 when being in communication with the upstream-side low-speed branched passage 13 of the throttle-valve upstream passage 12. The upstream-side low-speed branched individual intake passage 17 extends from the surge tank 4 to the valve body 8. The in-throttle upstream-side high-speed branched passage 18 forms an upstream-side high-speed branched individual intake passage 19 when being in communication with the upstream-side high-speed branched individual passage 14 in the throttle-valve upstream passage 12. The upstream-side high-speed branched individual intake passage 19 extends from the surge tank 4 to the valve body 8.

The valve body 8, in a cylindrical shape, extends in the space along the longitudinal direction of the space so as to rotate about a rotational axis (not shown) being in generally parallel with the axial direction of the crankshaft. An inner surface 20 defining the space and a peripheral surface of the valve body 8 are formed being slidable with each other and substantially prevent the intake air from leaking out therefrom. The inside of the valve body 8 is divided into an in-valve low-speed passage 21 and an in-valve high-speed passage 22 by a partition 15b so that the in-valve low-speed passage 21 and the in-valve high-speed passage 22 are defined adjacently with respect to the axial direction of the crankshaft. The in-valve low-speed passage 21 is disposed corresponding to the in-throttle upstream-side low-speed branched passage 16 and the in-valve high-speed stream passage 22 is disposed corresponding to the in-valve upstream high-speed passage 18.

Downstream of the valve body 8 in the throttle valve device 7, a throttle-valve downstream portion 23 is formed. The throttle-valve downstream portion 23 is communicably fixed to an intake port of cylinder head 24.

The inside of the throttle-valve downstream portion 23 is divided into a downstream-side low-speed branched passage 26 corresponding to the in-valve low-speed passage 21 and a downstream high-speed branched passage 27 corresponding to the in-valve high-speed passage 22 by a partition 15d so that these passages are defined adjacently with respect to the direction of the rotational axis. The intake port of the cylinder head 24 is divided into a low-speed intake port 28 and a high-speed intake port 29 by a partition 15e so that each of ports 28, 29 correspond to the downstream-side low-speed branched passage 26 and the downstream-side high-speed branched passage 27, respectively. The intake valves 30 are disposed on the downstream side of these ports 28 and 29, respectively. Each intake valve 30 is driven such that the low-speed intake port 28 is brought into communication with the combustion chamber 6 and the high-speed intake port 29 is brought into communication with the combustion chamber 6 during the intake stroke of the engine. A piston (not shown) is disposed in a cylinder bore 25a of a cylinder block 25 so as to reciprocate in the vertical direction of the engine body 6a. The combustion chamber 6 is defined by the piston and an inner wall of the cylinder bore 25a. The engine body 6a comprises the cylinder block 25 and the cylinder head 24. At the upper portion of the low-speed intake port 28 with respect to the vertical direction of the engine body 6a, a fuel injector 31 is disposed for injecting fuel to the intake air, and a guide opening 32 is provided for introducing fuel injected by the fuel injector 31 into the low-speed intake port 28.

FIG. 3 especially shows the condition where both the in-valve low-speed passage 21 and in-valve high-speed passage 22 of the valve body 8 are fully opened.

Referring to FIG. 3, the low-speed individual intake passage 10 is defined by the upstream-side low-speed branched passage 13, the valve upstream low-speed passage, the in-valve low-speed passage 21, the downstream-side low-speed branched passage 26, and the low-speed intake port 28. The high-speed individual intake passage 11 is defined by the upstream high-speed passage 14, the valve upstream high-speed passage, the in-valve high-speed passage 22, the downstream-side high-speed branched passage 27, and the low-speed intake port 29. The intake air flowing out of the surge tank 4 is supplied into the combustion chamber 6 through the low-speed individual intake passage 10 or the high-speed individual intake passage 11.

From an opening between the in-valve low-speed passage 21 and the downstream-side low-speed branched passage 26 to the downstream of the valve body 8 in the low-speed individual intake passage 10, the passage 10 extends along the tangential direction of the cylinder bore 25a in circular shape when viewed from above with respect to the vertical direction of the engine body 6a and is connected to the combustion chamber 6. This causes the intensified horizontally turning flow (swirl flow) in the combustion chamber 6, so as to improve combustibility, when the intake air is supplied into the combustion chamber 6 through only the low-speed individual intake passage 10. Similarly, from a communication opening between the in-valve high-speed passage 22 and the downstream-side high-speed branched passage 27 to the downstream of the valve body 8 in the high-speed individual intake passage 11, the passage 11 extends along the tangential direction of the cylinder bore 25a when viewed from above with respect the vertical direction of the engine body 6a and is connected to the combustion chamber 6. However, this connection is designed so that the above-described horizontally turning flow is cancelled by the intake air introduced from the high-speed individual intake passage 11 into the combustion chamber 6. That is, the intake valve 30 for the low-speed individual passage 10 and the valve 30 for the high-speed individual intake passage 11 are arranged symmetrically with respect to a line (not shown) passing through the center of the cylinder bore 25a and in parallel with the extending direction of the individual intake passage, in a top plan view of the engine body 6a. This intensifies the turbulent flow in the combustion chamber 6 to improve combustibility during the introduction of the intake air into the combustion chamber 6 through both the low-speed individual passage 10 and the high-speed individual intake passage 11. Moreover, each of the low-speed individual passage 10 and the high-speed individual intake passage 11 are formed straight in a top plan view of the engine body 6a, thereby reducing the resistance to intake flow.

Next, the valve body 8 is described in detail. As shown in FIG. 2, the in-valve low-speed passage 21 is defined by a first low-speed inner wall 33, second low-speed inner wall 34, a partition 15c and a side inner wall 35. The first low-speed inner wall 33 and the second low-speed inner wall 34 are arranged substantially symmetrically with respect to the rotational axis of the valve body 8 and arranged oppositely with each other. The relation between the first low-speed inner wall 33 and the second low-speed inner wall 34 is as follows. When the first low-speed inner wall 33 is aligned with the downstream end of the in-throttle upstream-side low-speed branched passage 16 (that is, in FIG. 2, the downstream end of the lower surface of the in-throttle upstream-side low-speed branched passage 16, with respect to the vertical direction of the engine body 6a) as the valve body 8 rotates, the second low-speed inner wall 34 is aligned with the upstream end of the downstream-side low-speed branched passage 26 (that is, in FIG. 2, the upstream end of the upper surface of the downstream-side low-speed branched passage 26, with respect to the vertical direction of the engine body 6a). In this condition, the downstream end of the first low-speed inner wall 33 is in contact with the inner wall 20 (in FIG. 2, the lower surface of the inner wall 20). On the other hand, the downstream end of the first low-speed inner wall 33 is out of contact with the upstream end of the downstream-side low-speed branched passage 26 (in FIG. 2, the upstream end of the lower surface of the downstream-side low-speed branched passage 26, with respect to the vertical direction of the engine body 6a).

This maintains a fully opened state of a downstream opening of the in-valve low-speed passage 21. In the above-described condition, the downstream end of the second low-speed inner wall 34 is in contact with the inner wall 20 (in FIG. 2, the upper surface of the inner wall 20). On the other hand, the downstream end of the second low-speed inner wall 24 is out of contact with the downstream end of the in-throttle upstream-side low-speed branched passage 16 (in FIG. 2, the downstream end of the upper surface of the in-throttle upstream low-speed branched passage 16 with respect to the vertical direction of the engine body 6a). This maintains a fully opened state of a downstream opening of the in-valve low-speed passage 21

Each of the first low-speed inner wall 33 and the second low-speed inner wall 34 are formed into a convex curve in such a way that central portions 33a, 34a with respect to the intake-flow direction are closer to the rotational axis of the valve body 8 than the respective upstream and downstream ends. This aims at facilitating the introduction of intake air, which flows from the lower surface with respect to the vertical direction of the engine body 6a through the in-throttle upstream-side low-speed branched passage 16, into the downstream-side low-speed branched passage 26 along the curved surface of the first low-speed inner wall 33, when the valve body 8 is fully open as shown in FIG. 2. As a result, the resistance to the intake air is lowered. In FIG. 2, the broken lines overlapping the valve body 8 show the positions of the inner walls 37, and 38 of the in-valve high-speed passage 22, as will be described later.

Figure 4:
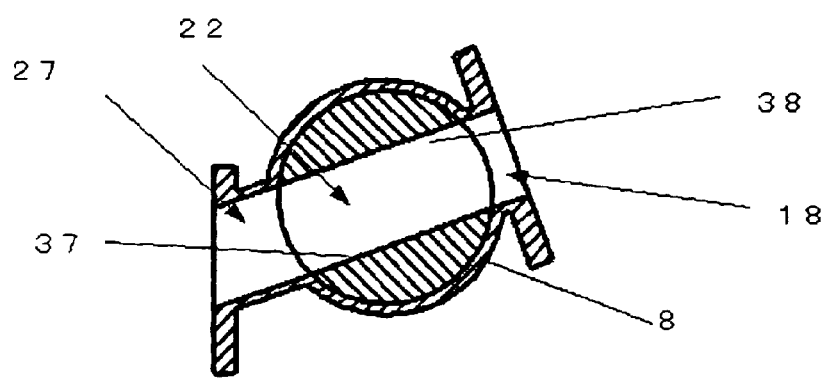
FIG. 4 is a cross-sectional view of a portion of the throttle valve device 7, taken in the axial direction of the crankshaft of the engine.

FIG. 4 shows the throttle valve 7 and the in-valve high-speed passage 22 in a condition where the opening of the valve body 8 is in the condition shown in FIG. 2. The in-valve high-speed passage 22 is defined by the first high-speed inner wall 37, the second high-speed inner wall 38, the partition 15c, and a side wall 36. The first high-speed inner wall 37 and the second high-speed inner wall 38 are oriented along the rotational axis of the valve body 8 and arranged oppositely to each other. As shown in FIG. 4, when the upstream end of the first high-speed inner wall 37 is aligned with the downstream end of the in-throttle upstream-side high-speed branched passage 18 (in FIG. 4, the downstream end of the lower surface of the valve upstream high-speed branched passage 18, with respect to the vertical direction of the engine body 6a), the upstream end of the second high-speed inner wall 38 is aligned with the downstream end of the in-throttle upstream-side high-speed branched passage 18 (in FIG. 4, the downstream end of the lower surface of the valve upstream high-speed branched passage 18, with respect to the vertical direction of the engine body 6a). On the other hand, the downstream end of the first high-speed inner wall 37 is aligned with the upstream end of the downstream-side high-speed branched passage 27 (in FIG. 4, the upstream of the lower surface of the downstream high-speed passage 27 with respect to the engine body). Moreover, the downstream end of the second high-speed inner-wall 38 is aligned with the upstream end of the downstream-side high-speed branched passage 27 (in FIG. 4, the upper end of the upper surface of the downstream high-speed branch passage with respect to the vertical direction of the engine body 6a). In this manner, in the valve body 8, the opening area of the upstream end of the in-valve high-speed passage 22 is smaller than that of the upstream end of the in-valve low-speed passage 21. Additionally, the opening area of the downstream end of the in-valve high-speed passage 22 is smaller than that of the downstream end of the in-valve low-speed passage 21. This allows the in-valve low-speed passage 21 to be fully opened when the in-valve high-speed passage 22 is fully opened. At this time, the increase in the resistance to the intake flow is concurrently suppressed.

Figure 5:
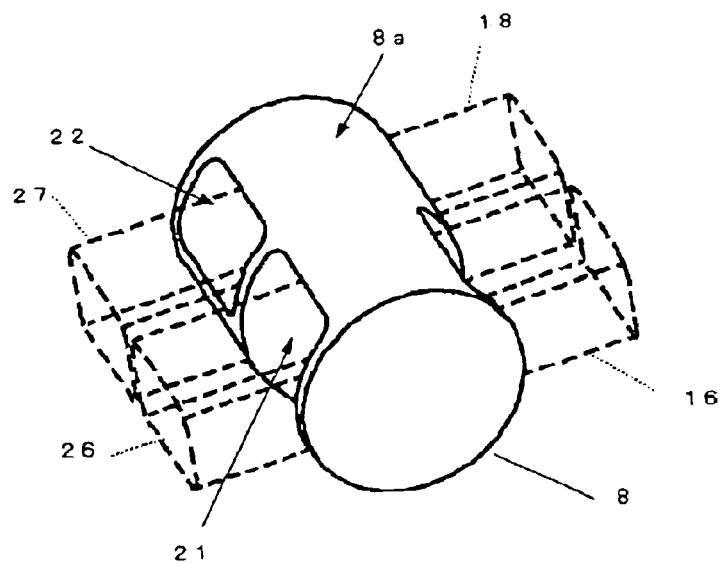
FIG. 5 is a perspective view of a portion of the throttle valve device 7.

FIG. 5 is a perspective view showing only the valve body 8 of the throttle valve device 7. This perspective view shows the condition where the in-valve low-speed passage 21 is fully opened, and the in-valve high-speed passage 22 is partially opened. As shown in FIG. 5, the partition 15c of the in-valve low-speed passage 21 is aligned with the partition 15*b* of the in-throttle upstream-side low-speed branched passage 16, and the side inner wall 35 of the in-valve low-speed passage 21 is aligned with the side inner wall of the valve upstream low-speed passage 16. Moreover, the partition 15*c* of the in-valve low-speed passage 21 is aligned with the partition 15*d* of the downstream-side low-speed branched passage 26, and the side inner wall 35 of the in-valve low-speed passage 21 is aligned with the side inner wall of the downstream low-speed passage 26. Furthermore, the partition 15*c* of the in-valve high-speed passage 22 is aligned with the partition 15*b* of the in-throttle upstream-side high-speed branched passage 18, the side inner wall 36 of the in-valve high-speed passage 22 is aligned with the side inner wall of the valve upstream high-speed passage 18. Still further, the partition 15*b* of the in-valve high-speed passage 22 is aligned with the partition 15*d* of the downstream-side high-speed branched passage 27, the side inner wall 36 of the in-valve high-speed passage 22 is aligned with the side inner wall of the downstream high-speed passage 27.

Figure 6:
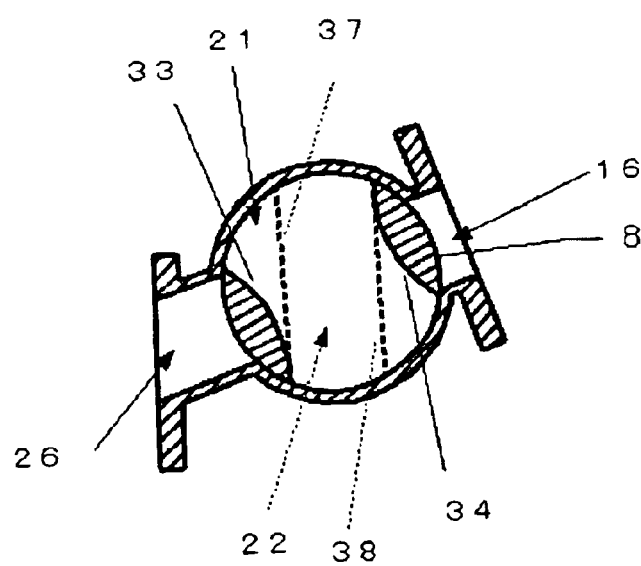
FIG. 6 is a cross-sectional view of a portion of the throttle valve device 7, taken in the axis direction of the crankshaft of the engine.

Next, the rotational motion of the valve body 8 in the throttle valve device 7 will be described. FIG. 2 shows the condition where both the in-valve low-speed passage 21 and the in-valve high-speed passage 22 are fully opened in the valve body 8, when the engine is in a full load state. To this, FIG. 6 shows the condition where both the in-valve low-speed passage 21 and the in-valve high-speed passage 22 are fully closed when the engine is shut down. As shown in FIG. 6, the in-valve low-speed passage 21 is arranged so that its longitudinal direction is substantially along the vertical direction of the engine body 6*a*, and the downstream end of the in-throttle upstream-side low-speed branched passage 16 is thus closed by the peripheral surface of the valve body 8. At this time, the upstream end of the downstream-side low-speed branched passage 26 is also closed and blocked by the peripheral surface 8*a* of the valve body 8. Also, in this condition, the dotted lines in FIG. 6 show the arrangement of the in-valve high-speed passage 22 defined by the first high-speed inner wall and the second high-speed inner wall. As shown, the longitudinal direction of the in-valve high-speed passage 22 is substantially along the vertical direction of the engine body 6*a*, and the downstream end of the in-throttle upstream-side high-speed branched passage 18 is closed and blocked by the peripheral surface 8*a* of the valve body 8. At this time, the upstream end of the downstream-side high-speed branched passage 27 is also closed and blocked by the peripheral surface 8*a* of the valve body 8.

Figure 7:
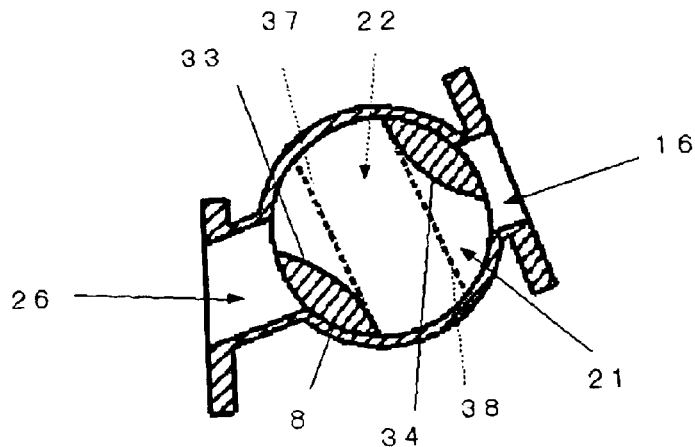
FIG. 7 is a cross-sectional view of a portion of the throttle valve device 7, taken in the axial direction of the crankshaft of the engine.

FIG. 7 shows the condition where the valve body 8 has been rotated counterclockwise in the drawing (in such a direction that the upstream opening of the in-valve low-speed passage 21 is positioned higher with respect to the vertical direction of the engine body 6*a* from the position as shown in FIG. 6) from the position as shown in FIG. 6. At this time, the engine is in the extremely low rotational speed and the light load condition. Referring to FIG. 7, the in-throttle upstream-side low-speed passage 16 is in communication with the in-valve low-speed passage 21 via an opening defined in the vicinity of the downstream end of the lower surface of the in-throttle upstream-side low-speed branched passage 16, with respect to the vertical direction of the engine body 6*a*. Concurrently, the downstream-side low-speed branched passage 26 is in communication with the in-valve low-speed passage 21 via an opening defined in the vicinity of the upstream end of the upper surface of the downstream-side low-speed branched passage 26, with respect to the vertical direction of the engine body 6*a*. These openings allow the intake air to be fed into the combustion chamber 6 through the in-valve low-speed passage 21. The amount of intake air depends on the area of these opening. Thus, FIG. 7 shows the condition where the amount of the intake air is lowered because the area of the opening is small. In FIG. 7, the in-valve high-speed passage 22, indicated by dotted lines as in FIG. 6, is shown still being fully closed.

Figure 8:
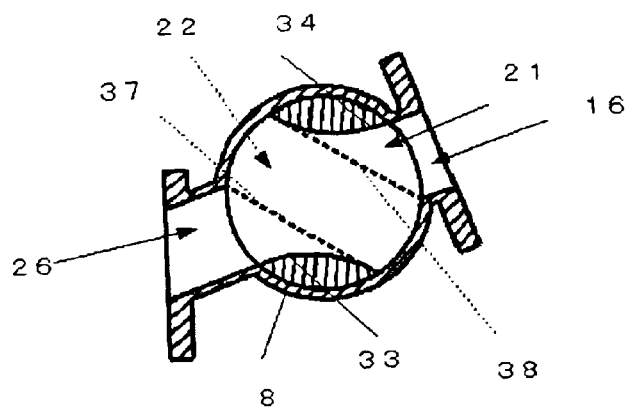
FIG. 8 is a cross-sectional view of a portion of the throttle valve device 7, taken in the axial direction of the crankshaft of the engine.

FIG. 8 shows the condition where the valve body 8 has been further rotated counterclockwise in the drawing from the position shown in FIG. 7 so that the opening of the in-valve low-speed passage 21 is substantially fully opened. At this time, the engine is in the predetermined low rotational speed and the predetermined low load condition. Referring to FIG. 8, the downstream end of the upper surface of the in-throttle upstream-side low-speed branched passage 16 with respect to the vertical direction of the engine body 6*a* is aligned with the upstream end of the second low-speed inner wall 34 in the in-valve low-speed passage 21. Thus, the openings between the in-throttle upstream-side low-speed branched passage 16 and the in-valve low-speed passage 21 is full. On the other hand, the upstream end of the lower surface of the downstream-side low-speed branched passage 26 with respect to the vertical direction of the engine body 6*a* is aligned with the downstream end of the first low-speed inner wall 33 in the in-valve low-speed passage 21. Thus, the opening between the downstream-side low-speed branched passage 26 and the in-valve low-speed passage 21 is also full. In this condition, the curved shapes of both the first low-speed inner wall 33 and the second low-speed inner wall 34 reduce the resistance to the intake flow. As indicated by a dotted line in FIG. 8, the in-valve high-speed passage 22 is still fully closed. When the valve body 8 is rotated counterclockwise by a certain amount from the position shown in FIG. 8, the in-valve high-speed passage 22 is brought into communication with the in-throttle upstream-side high-speed branched passage 18 and with the downstream-side high-speed branched passage 27, at the same time.

Figure 9:
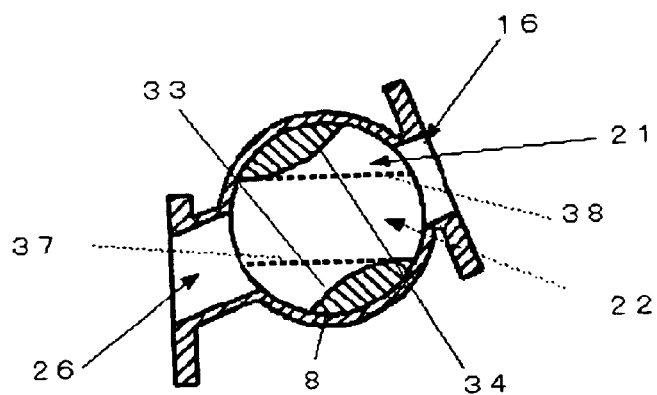
FIG. 9 is a cross-sectional view of a portion of the throttle valve device 7, taken in the axial direction of the crankshaft of the engine.

FIG. 9 shows the condition where the valve body 8 has been further rotated counterclockwise in the drawing from the position shown in FIG. 8 so that the opening of the in-valve low-speed passage 21 is maintained in the fully open state and the in-valve high-speed passage 22 is partially opened. At this time, the engine is in high rotational speed or high load condition (including in high rotational speed and high load condition). Referring to FIG. 9, the in-valve low-speed passage 21 is in full communication with the in-throttle upstream-side low-speed branched passage 16, and the in-valve low-speed passage 21 is also in full communication with the downstream-side low-speed branched passage 26. As for the in-valve high-speed passage 22 indicated by dotted lines in FIG. 9, the downstream end of the lower surface of the in-throttle upstream-side high-speed branched passage 18 with respect to the vertical direction of the engine body 6*a* is located away from the upstream end of the second high-speed inner wall 38 so as to form an opening therebetween. Additionally, the upstream end of the upper surface of the downstream-side high-speed branched passage 27 with respect to the vertical direction of the engine body 6*a* is located away from the downstream end of the first high-speed inner wall 37 so as to form an opening therebetween. These openings allow the intake air to be fed into the combustion chamber 6. The amount of the intake air is determined by summing up the opening area of these openings and the opening area of the in-valve low-speed passage 21 in the fully open state.

Figure 10:
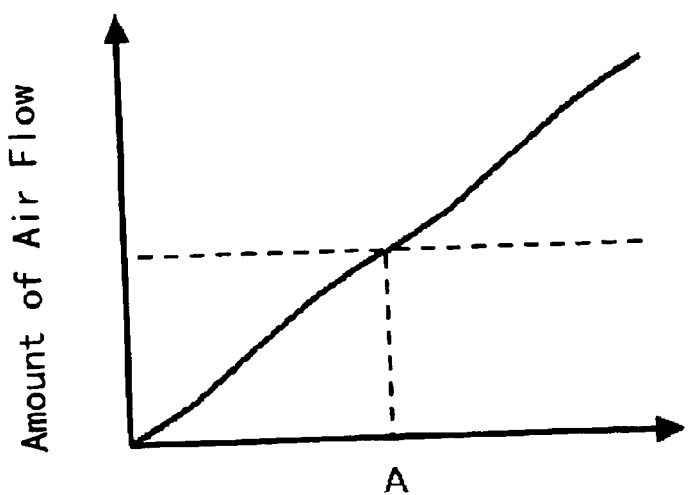
FIG. 10 is a diagram showing a relationship between the opening of the valve body 8 and the amount of the intake air passing therethrough.

Described next is the relationship between the opening of the valve body 8 in the throttle valve device 7 and the amount of the intake air passing therethrough in this embodiment. FIG. 10 shows the relationship between the opening of the valve body 8 in the throttle valve device 7 and the amount of the intake air passing therethrough, in the case of a constant amount of the intake air supplied from the surge tank 4 to the throttle valve device 7. The valve opening amount of "A" in FIG. 10 corresponds to the opening condition of the valve body 8 shown in FIG. 8 as above.

As shown in FIG. 10, the amount of the passing intake air linearly varies as the opening of the valve body 8 increases from the opening of "A" even when the condition shifts from one condition with the in-valve low-speed passage 21 being fully closed and the in-valve high-speed passage 22 being fully opened to another condition with the in-valve low-speed passage 21 being still fully closed and the in-valve high-speed passage 22 being opened This linear variation is similarly seen when the opening of the valve body 8 is reduced across the opening amount of "A", in reverse to the above.

Figure 11:
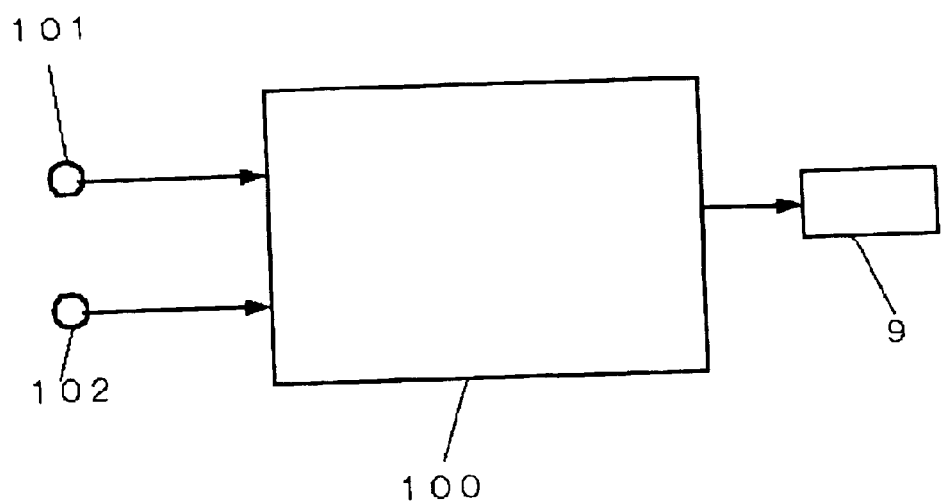
FIG. 11 is a block diagram of a control system.

FIG. 11 shows the block diagram of a control system for controlling the valve body 8 of the throttle valve device 7

A control unit 100 receives output signals from a pedal sensor 101 for detecting an accelerator pedal position of an accelerator pedal (not shown), and a rotational speed sensor 102 for detecting the engine rotational speed. The control unit 100 determines engine load from the acceleration pedal position, and determines the rotational angle i.e. the opening of the valve body 8 with reference to an opening map predetermined based on engine rotational speed and engine load. The actuator 9 controls the valve body 8 in accordance with the output signal from the control unit 100 so that the calculated opening is attained.

This embodiment acts as will be described. When the engine operation is shut down, the actuator 9 controls the opening of the valve body 8 to the position shown in FIG. 6. Thus, the communication between the in-throttle upstream-side low-speed branched passage and the downstream-side low-speed branched passage 26 is blocked and the communication between the in-throttle upstream-side high-speed branched passage 18 and the downstream-side high-speed branched passage 27 is substantially blocked. In this condition, the intake air is not supplied into the combustion chamber 6.

When the engine rotational speed is equal to or less than a predetermined speed and the engine load is equal to or less than a predetermined load (the operational condition of the low-speed and the low-load), for example, the valve body 8 is controlled to attain the opening shown in FIG. 7 or FIG. 8. Thus, the in-throttle upstream-side low-speed branched passage 16 is brought into communication with the downstream-side low-speed branched passage 26, while the communication between the in-throttle upstream-side high-speed branched passage 18 and the downstream-side high-speed branched passage 27 is substantially blocked. Accordingly, the intake air is supplied from the surge tank 4 into the combustion chamber 6 substantially through only the low-speed individual intake passage 10, so that the inertia effect of the intake flow is achieved in accordance with predetermined length or cross-sectional area of the low-speed individual intake passage 10 for the low-speed operational condition. As a result, the amount of the intake charge supplied into the combustion chamber 6 increases in the low-speed region. In the case, the swirl is intensified in the combustion chamber 6, so that the mixing of the fuel and air is promoted by an increase in the intake flow velocity even with a small amount of the intake air, thereby improving combustibility. The adjustment of the amount of the intake air may be performed by the control of the opening of the valve body 8 in the low-speed and low-load operational condition, so that the amount of the intake air is controlled in response to required output of a driver in the form of accelerator position.

When the engine rotational speed is equal to or larger than the predetermined speed or the engine load is equal to or larger than the predetermined load (including the high-speed and the high-load operational condition), for example, the opening of the valve body 8 is controlled to attain the opening shown in FIG. 9 or FIG. 2. Thus, the full communication is maintained between the in-throttle upstream-side low-speed branched passage 16 and the downstream-side low-speed branched passage 26, and the communicative area is regulated between the in-throttle upstream-side high-speed branched passage 18 and the downstream-side high-speed branched passage 27. Accordingly, the intake air is supplied from the surge tank 4 into combustion chamber 6 through both the low-speed individual intake passage 10 and the high-speed individual intake passage 11, so that the inertia effect of the intake flow is achieved in accordance with predetermined length or cross-sectional area in the low-speed individual intake passage 10 and the high-speed individual intake passage for the high-speed operational condition. As a result, the amount of the intake charge increases in the high-speed region. Similarity to the above, the adjustment of the amount of the intake air may be performed by the control of the opening of the valve body 8 in the low-speed and low-load operational condition, so that the amount of the intake air is controlled in response to required output of a driver in the form of accelerator position.

Next, the effect of the embodiment will be described. According to this embodiment of the multi-cylinder engine, each individual intake passage 6 provided for each cylinder is divided into the low-speed individual intake passage 10 and the high-speed individual intake passage 11. At the midstream of each passage, the rotary-type throttle valve device 7 is provided for controlling the communicative condition of each passage. With this throttle valve device 7, during the low engine rotational speed, the intake air is supplied into the combustion chamber 6 through only the low-speed individual intake passage 10. On the other hand, during the high engine rotational speed, the intake air is supplied into the combustion chamber 6 through both the low-speed individual intake passage 10 and the high-speed individual intake passage 11. Accordingly, a simple throttle valve device 7 is provided, which has two valve functions of a throttle valve and a switching valve for the inertia effect of the intake air. Moreover, the throttle valve device 7 is superior in layout performance. Particularly, the device 7 is easily mounted closely to the engine body 6a, which shortens the distance between the throttle valve device 7 and the combustion chamber 6, thereby improving the response of the intake air supply. Furthermore, the throttle valve device 7 is positioned in generally parallel with the longitudinal direction of the engine body 6a (the axial direction of the crankshaft), and commonly used as valves for all the cylinders. Accordingly, the overall structure of the system is simplified, which further improves the layout performance.

Still further, the throttle valve device 7 is located in parallel with the longitudinal direction of the engine body 6a, and the individual intake passage 5 extends perpendicularly from the throttle valve device 7 to the combustion chamber 6a. Additionally, the low-speed individual intake passage 10, including the opening of the valve body 8 of the throttle valve device 7, is directed along the tangential direction of the cylinder bore 25a. Accordingly, the swirl is intensified during low-speed operational condition. Moreover, the fuel injector 31 is located in only the low-speed individual passage 10, thereby supplying the fuel over the whole operational condition.

According to this embodiment, as shown in FIGS. 7 and 9, the pair of the downstream-side low-speed branched passage 26 and the low-speed intake port 28, and the pair of the downstream-side high-speed branched passage 27 and the low-speed intake port 29 slantingly extend from diagonally above the combustion chamber 6 towards the combustion chamber 6, and curve downwardly adjacent to the intake valve 30. And then, the valve 8 is rotated counterclockwise in the drawing so that the opening of the in-valve low-speed passage 21 and the in-valve high-speed passage 22 is gradually enlarged from the upper side with respect to the vertical direction of the engine body 6a, as the valve 8 is rotated. Therefore, the intake air flows out of the opening along the upper wall surfaces of the downstream-side low-speed branched passage 26 and the low-speed intake port 28, or the upper wall surfaces of the downstream-side high-speed branched passage 27 and the high-speed intake port 29. Next, the intake air flow is curved in the curve portion adjacent to the intake valve 30, and introduced into the combustion chamber 6. As a result, the intake air supplied into the combustion chamber 6 intensifies vertically turning flow (tumble flow), thereby improving the mixing fuel with air, and hence combustibility, when the opening area of the in-valve low-speed passage 21 or the in-valve high-speed passage 22 is partially opened or less.

Another embodiment of the present invention will now be described. Although, in the forgoing embodiments, the upstream-side high-speed branched passage 14 and the upstream-side low-speed branched passage 13 are formed by providing the partition in a throttle-valve upstream passage 12, the present invention is not limited to this configuration. For example, those passages 13,14 may be divided into a pair of individual passages visually spaced apart. Additionally, although, in the throttle valve device 7 of the forgoing embodiment, each portion formed between the surface of the inner wall 33, 34, 37, and 38, and the outer side of the valve body 8 is formed as a thick wall, the present invention is not limited to this configuration. Particularly, the peripheral surface of the valve body 8a may be partially cut away to form depressions receding towards its inner wall. This achieves the lightweight construction of the valve body 8a. Additionally, the friction is reduced between the peripheral surface 8a of the valve body 8 in the throttle valve device 7 and the inner wall 20 which holds the valve body 8, thereby improving response in the control of the valve body 8.

Moreover, in the forgoing embodiment, the supply of the intake air is performed through the low-speed individual passage in low-speed and low-load engine operational condition, and the supply of the intake air is performed through both the low-speed individual passage and the high-speed individual passage in the region except that operational condition. Instead, the supply of the intake air may be controlled to occur through the low-speed individual passage even during the high-load, in the low-speed operational condition where the engine rotational speed is equal to or less than the predetermined speed. This control increases the amount of the intake charge by the inertia effect of the intake flow.

Furthermore, in the forgoing embodiment, the downstream-side low-speed branched passage 26 and the downstream-side high-speed branched passage 27 are divided by the partition 15d and the low-speed intake port 28 and the high-speed intake port 29 are divided by the partition 15e. Instead, partitions 15d, 15e may be omitted so as to form a common passage. Sill further, the partition 15d between the downstream-side low-speed branched passage 26 and the downstream-side high-speed branched passage 27 may be formed, while the partition 15e lying away from the intake valve 30 is omitted.

Additionally, in the forgoing embodiment, the throttle-valve upstream passage 12 formed unitarily with the surge tank 4 and the throttle valve device 7 formed unitarily with the throttle-valve downstream portion 23 are separated from each other. This improves production efficiency of the individual parts and ease in assembling by integrating a plurality of parts into one-piece. Moreover, the part of the throttle valve device 7 can be commonly used for another type of engine. Instead, the surge tank 4, the upstream passage, and the throttle valve device 7 may be integrally formed as one-piece, which reduces the number of the parts and improves assembling performance. In this case, the valve body 8 may be attached to the throttle valve device 7 either before or after the integrated parts is assembled to the engine body 6a, with improved assembling efficiency.

Moreover, in the forgoing embodiment, the inside of the valve body 8 is divided into the in-valve low-speed passage 21 and the in-valve high-speed passage 22. However, the embodiment may be modified in the following manner by way of example: the inside of the valve body 8 is formed with a single in-valve intake passage, and the partition 15d between the downstream-side low-speed branched passage 26 and the downstream-side high-speed branched passage 27 is omitted at least at the downstream of the valve body 8 to form a common passage (common port); the upstream-side low-speed branched individual intake passage 17 and the upstream-side high-speed branched individual intake passage 19 are divided by partitions 15a, and 15b at the upstream of the valve body 8 so that the passages are arranged adjacently in the direction perpendicular to the rotational axis direction; and the passages 17, and 19 are directed to the valve body 8 so as to be communicated with the intake passage 8 in the valve body 8. With the above structure, the rotation of the valve 8 brings the in-valve intake passage into communication with only the upstream-side low-speed branched individual intake passage 17 during the low-speed operational condition, and on the other hand, the valve 8 brings the in-valve intake passage into communication with both the upstream-side low-speed branched individual intake passage 17 and the upstream-side high-speed branched individual intake passage 19 during the high-speed operational condition. Therefore, similar to the forgoing embodiment, a simple intake system 1 is provided which improves the inertia effect of the intake flow and response of intake air at once.

According to the present invention, the valve having two functions of the inertia effect of the intake flow and the throttle valve is located relatively closely to the combustion chamber in the engine, thereby attaining both the inertia effect of the intake flow and the acceleration response with a simple structure.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A air intake system for multi-cylinder engine comprising,
   a common intake passage for supplying intake air to a combustion chamber of each cylinder,
   a plurality of individual intake passages branching off from said common intake passage so as to supply the intake air to the combustion chamber of each cylinder,
   a rotary-type throttle valve provided for each of the individual intake passages, including a valve body in a circular shape when viewed along its rotational axis which defines a space as a part of an intake passage, and being capable of linearly controlling the amount of intake air supplied into the combustion chambers, wherein, said individual intake passage comprises a low-speed branched intake passage and a high-speed branched intake passage which supply the intake air to said throttle valve, the inside of said valve body of the throttle valve is formed with an in-valve low-speed passage which is adapted to communicate said low-speed branched intake passage with the combustion chamber, and an in-valve high-speed passage which is adapted to communicate said high-speed branch intake passage with the combustion chamber; and
   a control means-for controlling the opening of the throttle valve in accordance with the engine operational condition so that said low-speed branch passage and said in-valve low-speed passage are in communication with each other when the engine rotational speed is low, and the high-speed branch passage and the in-valve high-speed passage are in communication with each other when the engine rotational speed is high, and said in-valve low-speed passage is designed so as to be in full communication with said low-speed branch passage during the high speed operation.

2. The intake air system for the multi-cylinder internal combustion engine claimed in claim 1,
   wherein said in-valve low-speed passage is defined by inner walls which are oppositely arranged in the valve body and are in parallel with the rotational axis of the throttle valve, and the central portions of said inner walls with respect to the direction of the intake flow are formed into a convex shape such that the central portions are closer to the rotational axis than the upstream end and the downstream end of the inner walls with respect to the intake flow.

3. The intake air system of a multi-cylinder internal combustion engine claimed in claim 1,
   wherein a volume chamber is formed in a portion where the common passage and the individual passage are connected with each other.

* * * * *